United States Patent [19]

Whelchel et al.

[11] Patent Number: 5,034,910

[45] Date of Patent: Jul. 23, 1991

[54] SYSTOLIC FAST FOURIER TRANSFORM METHOD AND APPARATUS

[75] Inventors: John E. Whelchel, Woodbridge; James F. McArthur, Falls Church, both of Va.

[73] Assignee: E-Systems, Inc., Dallas, Tex.

[21] Appl. No.: 528,366

[22] Filed: May 25, 1990

Related U.S. Application Data

[63] Continuation of Ser. No. 167,732, Mar. 14, 1988, abandoned.

[51] Int. Cl.$^5$ ............................................. G06F 15/332
[52] U.S. Cl. ..................................................... 364/726
[58] Field of Search .......................................... 364/726

[56] References Cited

U.S. PATENT DOCUMENTS

| | | | |
|---|---|---|---|
| 3,588,460 | 6/1971 | Smith | 364/726 |
| 3,777,131 | 12/1973 | Llewellyn | 364/726 |
| 4,293,921 | 10/1981 | Smith, Jr. | 364/726 |
| 4,601,006 | 7/1986 | Liu | 364/726 |
| 4,604,721 | 8/1986 | Gray | 364/726 |

OTHER PUBLICATIONS

Bergland et al., "Digital Real-Time Spectral Analysis", IEEE Trans. on Electronic Computers, vol. EC-16, No. 2, Apr. 1967, pp. 180–185.

Groginsky et al., "A Pipeline Fast Fourier Transform", IEEE Trans. on Computers, vol. C-19, No. 11, Nov. 1970, pp. 1015–1019.

Primary Examiner—David H. Malzahn
Attorney, Agent, or Firm—Rogers & Killeen

[57] ABSTRACT

An apparatus and method for performing Fourier transformations on an input stream of digital data without switches in the cross channel communication paths. A new systolic method for performing a Fast Fourier Transform (FFT) is derived from a constant geometry method using phase shifting of data in a channel to obtain the proper data sequence, rather than switches to transfer data among channels. A standard global shuffle operator is decomposed into phase shift operators and random access memory shuffle operators that operate only in one channel. The result is further simplified by merging the phase shift operators with twiddle factors from the constant geometry method. The communications paths for the data are thereby fixed, creating the opportunity for higher radix operations than are available with devices employing switches for cross channel data transfer.

22 Claims, 7 Drawing Sheets

FIG. 8

| A CALC# | B STAGE 1 | | | | C STAGE 2 | | | | D STAGE 3 | | | |
|---|---|---|---|---|---|---|---|---|---|---|---|---|
| 0  | 0  | 0  | 0  | 0  | 0  | 0  | 0  | 0 | 0  | 0  | 0  | 0  |
| 1  | 0  | 1  | 2  | 3  | 0  | 0  | 0  | 0 | 0  | 48 | 32 | 16 |
| 2  | 0  | 2  | 4  | 6  | 0  | 0  | 0  | 0 | 0  | 32 | 0  | 32 |
| 3  | 0  | 3  | 6  | 9  | 0  | 0  | 0  | 0 | 0  | 16 | 32 | 48 |
| 4  | 12 | 0  | 4  | 8  | 12 | 0  | 4  | 8 | 0  | 0  | 0  | 0  |
| 5  | 15 | 0  | 5  | 10 | 12 | 0  | 4  | 8 | 16 | 0  | 48 | 32 |
| 6  | 18 | 0  | 6  | 12 | 12 | 0  | 4  | 8 | 32 | 0  | 32 | 0  |
| 7  | 21 | 0  | 7  | 14 | 12 | 0  | 4  | 8 | 48 | 0  | 16 | 32 |
| 8  | 16 | 24 | 0  | 8  | 16 | 24 | 0  | 8 | 0  | 0  | 0  | 0  |
| 9  | 18 | 27 | 0  | 9  | 16 | 24 | 0  | 8 | 32 | 16 | 0  | 48 |
| 10 | 20 | 30 | 0  | 10 | 16 | 24 | 0  | 8 | 0  | 32 | 0  | 32 |
| 11 | 22 | 33 | 0  | 11 | 16 | 24 | 0  | 8 | 32 | 48 | 0  | 16 |
| 12 | 12 | 24 | 36 | 0  | 12 | 24 | 36 | 0 | 0  | 0  | 0  | 0  |
| 13 | 13 | 26 | 39 | 0  | 12 | 24 | 36 | 0 | 48 | 32 | 16 | 0  |
| 14 | 14 | 28 | 42 | 0  | 12 | 24 | 36 | 0 | 32 | 0  | 32 | 0  |
| 15 | 15 | 30 | 45 | 0  | 12 | 24 | 36 | 0 | 16 | 32 | 48 | 0  |

FIG. 9

| CALC# | C(i) | | | |
|---|---|---|---|---|
| 0  | 0  | 0  | 0  | 0  |
| 1  | 16 | 1  | 2  | 3  |
| 2  | 32 | 2  | 4  | 6  |
| 3  | 48 | 3  | 6  | 9  |
| 4  | 12 | 0  | 4  | 8  |
| 5  | 15 | 16 | 5  | 10 |
| 6  | 18 | 32 | 6  | 12 |
| 7  | 21 | 48 | 7  | 14 |
| 8  | 16 | 24 | 0  | 8  |
| 9  | 18 | 27 | 16 | 9  |
| 10 | 20 | 30 | 32 | 10 |
| 11 | 22 | 33 | 48 | 11 |
| 12 | 12 | 24 | 36 | 0  |
| 13 | 13 | 26 | 39 | 16 |
| 14 | 14 | 28 | 42 | 32 |
| 15 | 15 | 30 | 45 | 48 |

SYSTOLIC FAST FOURIER TRANSFORM METHOD AND APPARATUS

This is a continuation of application Ser. No. 167,732, filed Mar. 14, 1988 now abandoned.

BACKGROUND OF THE INVENTION

This invention relates to an apparatus and method for performing Fourier transformations on a set of digital data. More specifically, it relates to a processor for computing the Fast Fourier Transform (FFT) of discrete signals sampled from a continuously received electronic signal. Techniques for computing FFTs involve the rapid computation of multiple Discrete Fourier Transforms (DFTs). The DFT is the tool used to describe the relationship between the time domain and frequency domain representations of discrete signals.

Devices and methods for performing FFTs derive their efficiency from the relationship of the number of data words to be transformed (N) to the number of operations required to compute the DFT ($N^2$). If a large DFT can be replaced by multiple small DFTs (e.g., with radix R of 2 or 4), the number of operations required can be substantially reduced. Further, the computation of multiple small DFTs is a multistage process, with each stage having similar steps. This allows the processor calculating the FFT to have fewer unique components. The number of stages (B) is related to the sample size and the radix by: $B = Log_R N$. A large number of stages, however, can increase computational complexity and reduce the accuracy of the results due to round-off errors. Therefore, to increase processing efficiency through increased sample size N, methods for performing FFT have been driven to a compromise between the DFT radix R and number of stages B, with the radix generally limited to 4 or 8 by the complexity and cost of the switching in the data paths.

Several distinct methods for performing FFTs have been discussed in the prior art and have resulted in dissimilar architectures when implemented in hardware. The first was devised by Cooley and Tukey (Cooley, J. W. and Tukey, J. W., "An Algorithm for the Machine Calculation of Complex Fourier Series", *Math Comput.*, Vol. 19, April 1965, pp. 297-301). This type has "variable geometry", meaning that data addressing changes from stage to stage.

The second type is the "constant geometry" type, introduced by Pease (Pease, M. C., "An Adaptation of the Fast Fourier Transform for Parallel Processing", *Journal of the Association for Computing Machinery*, Vol. 15, April 1968, pp. 252-264). The addressing of data remains the same from stage-to-stage. The only price for achievement of this simplification of the resulting hardware architecture is a change in ordering of the read-only-memory (ROM) "twiddle factors" relative to those in the variable geometry type. In both types, the ROM factors ordering will change from stage to stage, and this is generally handled with address counters.

A more recent development is the introduction of "pipeline processors". This architecture divides the computing load into successive parallel stages, allowing simultaneous processing of R channels. One well known example of a pipeline processor in a variable geometry architecture is credited to McClellan and Purdy, (McClellan, J. H. and Purdy, R. J., "Applications of Digital Signal Processing", pp. 268-278, Alan V. Oppenheim, editor, 1978, Prentice Hall). In order to keep up with the rate of parallel data input, the computational elements in each stage are themselves 4-point FFTs (instead of DFTs) with 2 stages, each with 4 arithmetic processors per stage. However, as the radix increases to 8 or higher to provide more parallelism, the increasing number of commutator or cross-bar switches becomes prohibitively expensive.

A pipelined FFT processor using the constant geometry architecture has been developed by Corinthios (Corinthios, M. J., "The Design of a Class of Fast Fourier Transform Computers" *IEEE Transactions on Computers*, Vol. C-20, June 1971, pp. 617-623). This architecture also requires switching and gating for cross channel communication. It also has complex and large memory requirements which become more unwieldy as the radix increases (i.e., memory length is a function of $N/R^2$, therefore the number of memory units required is $R^2$) Implementations of this processor are disclosed in the Corinthios U.S. Pat. No. 3,754,128 dated Aug. 21, 1973, and in "A Parallel Radix-4 Fast Fourier Transform Computer", *IEEE Transaction On Computers*, Vol. C-24, January 1975, pp. 80-92.

Other developments have focused on particular features of the devices and methods just described. The Perry U.S Pat. No. 4,159,528, dated June 26, 1979, introduces a correction for the phase shift introduced by the Fourier transform. The technique uses a barrel switch and delay elements to make the proper phase correction to outputs from small DFTs before combining them in a larger Fourier transform. The McGee U.S. Pat. No. 4,534,009, dated Aug. 6, 1985, implements the McClellan and Purdy architecture and discloses the use of switches and shift registers to increase the arithmetic efficiency of the computational units.

All of the single and multichannel FFT processor architectures just described require some type of interchannel communication path using switches. These paths can dynamically change with time, and with the stage in the variable geometry case.

It is accordingly an object of the present invention to provide an apparatus for performing the FFT of digital data without switches in the cross channel communication paths.

It is another object of the present invention to provide an apparatus for performing the FFT of digital data by implementing a new systolic geometry method where the stage-to-stage structure is substantially duplicated.

It is still another object of the present invention to provide an apparatus for performing the FFT of digital data where the radix size is not limited by complexity and/or cost of the switching arrangement.

It is yet another object of the present invention to provide an apparatus for performing the FFT of digital data that utilizes the phase shifting property of the Fourier transform for part of the data shuffling.

It is a further object of the present invention to provide a method for performing the FFT of digital data without a step for switching data in cross channel communication paths.

These and many other objects and advantages will be readily apparent to one skilled in the art to which the invention pertains from a perusal of the claims and the following detailed description of the preferred embodiments when read in conjunction with the appended drawings.

THE DRAWINGS

Figure 7:
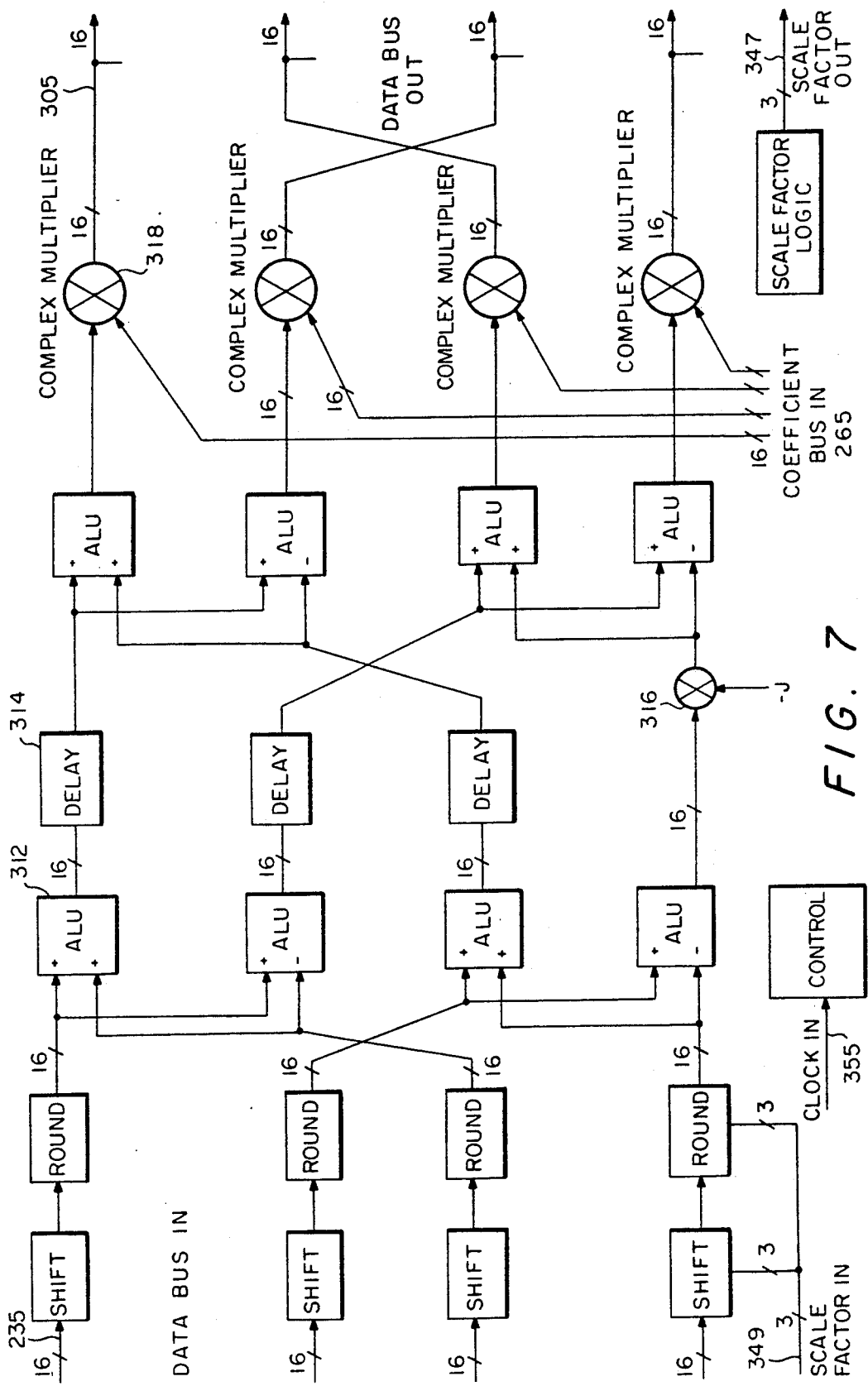
FIG. 7 shows the computational architecture of the FFT computational element of FIG. 6.

FIG. 8 displays the twiddle coefficients used in a version of the FFT computational element of FIG. 7.

FIG. 9 is a smaller ROM version of the twiddle coefficients shown in FIG. 8.

DETAILED DESCRIPTION OF THE PREFERRED EMBODIMENTS

The present invention is an apparatus and method for performing a Fast Fourier Transform (FFT) implementing a new systolic geometry method derived from the constant geometry method of Pease. Digital data are received in windows of N complex data words and sorted in R independent and parallel channels. The data are then sequenced through $Log_R N$ serially arranged stages. Each stage has a data addressing operator (an $N \times N$ matrix known as a random access memory (RAM) shuffle operator), a Fourier transform operator having computational elements that are themselves FFTs or DFTs (known as kernels), a random access memory for each channel, a twiddle factor operator and a novel phase shift operator to modify the data to be transformed without cross channel communication.

Conceptually, this operation is accomplished by factoring the standard global shuffle operator for each stage that is used in FFT processors of this general type (see Pease and Corinthios, supra) into three permutation operators. The second of these permutation operators is constrained to operate on one data element in each channel, providing it to the proper kernel. For example, in a radix 4 embodiment, this means that four data words, one from each of four channels, are presented to a 4-point FFT kernel simultaneously in each stage. The first and third of the permutation operators are transformed into the phase shift operators. These operators perform the equivalent of switching the data words (to get the proper data words together for presentation to the kernels) by making phase rotations on the complex data words in each channel separately. In this manner relatively straight forward addressing of random access memories in each channel can be used to obtain the appropriate data words, rather than using the switches disclosed in the prior art.

Throughout the description of the invention that follows, N=64 and R=4 (yielding 3 stages) except where specifically noted. These values are used for example only and should not be construed to be limiting the invention. The method will apply to any radix R and sample size N, although both N and R are generally integer powers of 2.

The constant geometry FFT calculation method of the prior art can be depicted in matrix form as: (read right-to-left for the order of matrix operations).

$$F_{64}X = \underbrace{F_4 \, S_{4/16}}_{\text{Stage 3}} \; | \; \underbrace{D_{16} \, F_4 \, S_{4/16}}_{\text{Stage 2}} \; | \; \underbrace{D_{64} \, F_4 \, S_{4/16}}_{\text{Stage 1}} X$$

where,

X = input column data vector of N=64 complex data words, $S_{4/16}$ = shuffle operator which selects 4 data words spaced 16 data words apart from the input vector and groups them together for input to the Fourier transform operator, $F_4$ = Fourier transform operator, an $N \times N$ block diagonal matrix containing 4-point DFTs along the block diagonal, $D_{64}$ and $D_{16}$ are "twiddle factors" to be discussed later, $F_{64}$ = DFT matrix with rows in digit reversed order.

The $S_{4/16}$ shuffle operator changes the order of data in a column vector from a sequence of 0,1,2, ..., N−1 to N/R sequences of 0, N/R, 2N/R, ..., (R−1)N/R; 1, [N/R]+1, ..., [(R−1)N/R]+1; ...; ]N/R]−1, ..., N−1. The same effect is achieved by shifting R parallel input channels $^N$/R data words relative to adjacent channels. For N=64 and R=4, an input sequence of 0,1,2, ..., 63 is changed to

| |
|---|
| 0, 1, 2, ..., 15 |
| 16, 17, 18, ..., 31 |
| 32, 33, 34, ..., 47 |
| 48, 49, 50, ..., 63 |

The operator $F_4$ is more accurately described as $(I_{16} \text{X} F_4)$ where X represents the Kronecker product of the two matrices. As an operator, this matrix is equivalent to performing a 4-point Fourier transform on four data words presented to its input and then repeating the process on consecutive groups of four data words until a complete pass is made through a window of N complex data words. For N=64, sixteen repeated operations are performed.

The "twiddle factors" are described in Pease, supra, and are defined as follows:

$$D_{64} = \text{Diag }\{I_{16}, D_{16}, D_{16}^2, D_{16}^3\}$$

where, $$D_{16} = \begin{bmatrix} w^0 & & & \\ & w^1 & & 0 \\ & & \ddots & \\ & & & \\ 0 & & & w^{15} \end{bmatrix}$$

and, $$w = e^{-j2\pi/64}$$

The twiddle factor valves are coefficients resulting from the derivation of the constant geometry FFT method by Pease. They are calculable from the equation given above and are constant for a given N and R.

The vector X will be deleted from ensuing discussions for convenience. The resulting expressions are thus matrix factorizations of the DFT matrix, $F_{64}$.

Consideration of the prior art just described shows that it has similar shuffle operators and Fourier transform operators in each stage. Only the twiddle factors are unique in each stage. The shuffle operators, moreover, are global in that they address data from all channels throughout the significantly large time interval of the window of 64 data words. This feature has tended to constrain hardware configurations into single channel operations.

Figure 1:
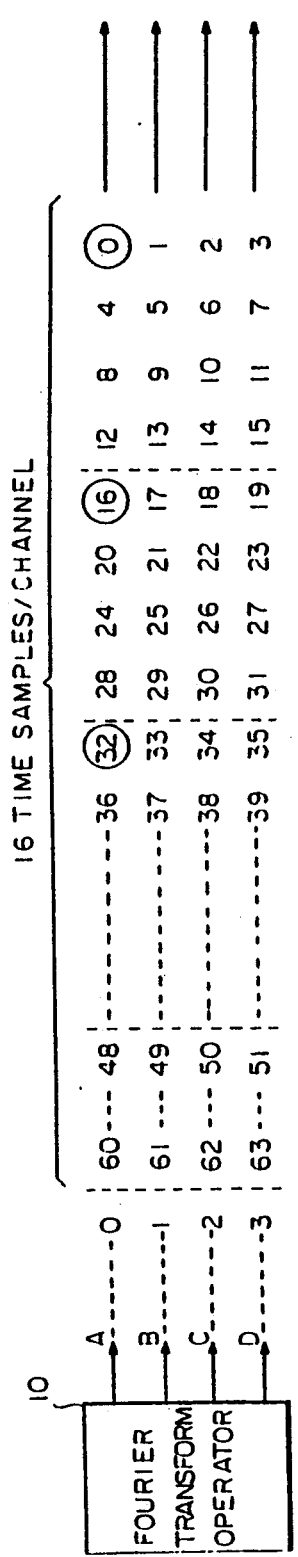
FIG. 1 is a depiction of the unswitched order of data words exiting an FFT processor found in the prior art.

Significantly, when the data words enter the second stage, they are no longer in the proper sequence for the next $S_{4/16}$ operator due to their presence in the same data channel. The data must be manipulated to present the proper sequence to the second stage. With reference to FIG. 1, data words from the Fourier transform operator 10 are output in four channels A-D in the order indicated by the numbers shown. Data input to the next stage, however, is required in groups of four data words indicated by the circled numbers. To align these data words in their proper channels, cross channel communication has heretofore been required. In the prior art this has been accomplished using switches. The McClellan, Purdy pipeline architecture, for example, performs the cross channel manipulation using a combination of FIFO memories of differing delays and a commutator switch.

As the first step to reaching the systolic geometry method of the present invention, and in order to provide for processing of R parallel channels without switches, the shuffle operator of the prior art is factored into three operators:

$$S_{4/16} = S_{pf} S_R S_p$$

where, $S_{pf}$ = fast cyclic shuffle (every data word)

$S_R$ = random access memory (RAM) shuffle, constrained to operate on one data word from each channel so that separate RAMs can be used in each channel, $S_p$ = slow cyclic shuffle (one every 4th data word)

The Sp shuffle cycles sets of four data words within each larger group of 16 data words. With N=64, there are four groups of 16. The first group of 16 data words is not changed at all. Each set of four data words in the second group of 16 is cycled by one data word as demonstrated below:

$$\begin{vmatrix} 19 \\ 16 \\ 17 \\ 18 \\ \hline 23 \\ 20 \\ 21 \\ 22 \\ \hline 27 \\ 24 \\ 25 \\ 26 \\ \hline 31 \\ 28 \\ 29 \\ 30 \end{vmatrix} = S_p \begin{vmatrix} 16 \\ 17 \\ 18 \\ 19 \\ \hline 20 \\ 21 \\ 22 \\ 23 \\ \hline 24 \\ 25 \\ 26 \\ 27 \\ \hline 28 \\ 29 \\ 30 \\ 31 \end{vmatrix}$$

Each set of four data words in the third group of 16 is cycled by two data words and in the fourth group by three data words.

Using the constant geometry method previously discussed, the second and third stage global shuffles are replaced with the three permutation operators as shown below (the first stage shuffle will remain unchanged):

$$F_{64} = F_4 S_{pf} S_R S_p \mid D_{16} F_4 S_{pf} S_R S_p \mid D_{64} F_4 S_{4/16}$$

The "D" twiddle factors are reordered by multiplying each by ($S_p^{-1} S_p$) and passing $S_p$ through the "D" factor creating $S_p^{-1} D_{16'} S_p$ in place of $D_{16}$ and $S_p^{-1} D_{64'} S_p$ in place of $D_{64}$ (primes indicative of reordering). Each $S_p^{-1}$ then is merged with the $S_p$ from the adjacent channel, in effect cancelling them out, to form;

$$F_{64} = F_4 S_{pf} S_R \mid D_{16'} S_p F_4 S_{pf} S_R \mid D_{64'} S_p F_4 S_{4/16}$$

$S_{pf}$ and $S_p$ pass through $F_4$, without modifying $F_4$, creating phase shift operators $D_{PH}$ and $D_{PH'}$ and forming the basic systolic geometry method of the present invention.

$$F_{64} = D_{PH} F_4 S_R \mid D_{16'} D_{PH} F_4 D_{PH'} S_R \mid D_{64'} F_4 D_{PH} S_{4/16}$$

Much of the constant geometry architecture is retained with differences appearing in twiddle factors and phase rotation operators. The first stage shuffle operator is also retained.

The phase shift operators $D_{PH}$ and $D_{PH'}$ perform the equivalent of cross channel switching by modifying the coefficients of the complex data words. The phase shift operators shift the phase of R of the complex data words in each channel by multiples of 360/R degrees (e.g., for R=4, the phase shifts are 0 for the first channel, $\pi/2$ for the second channel, $\pi$ for the third channel, and $3\pi/2$ for the fourth channel, or equivalently multiplying by 1, j, −1, −j). The operators use the "shift" property of the DFT kernel wherein a cyclic shift in the input domain is equivalent to multiplication by complex exponentials in the transform domain and vice versa. These shifts put the data words in proper sequence without using data words from another channel, thus eliminating the need for cross-channel switching.

Figure 2:
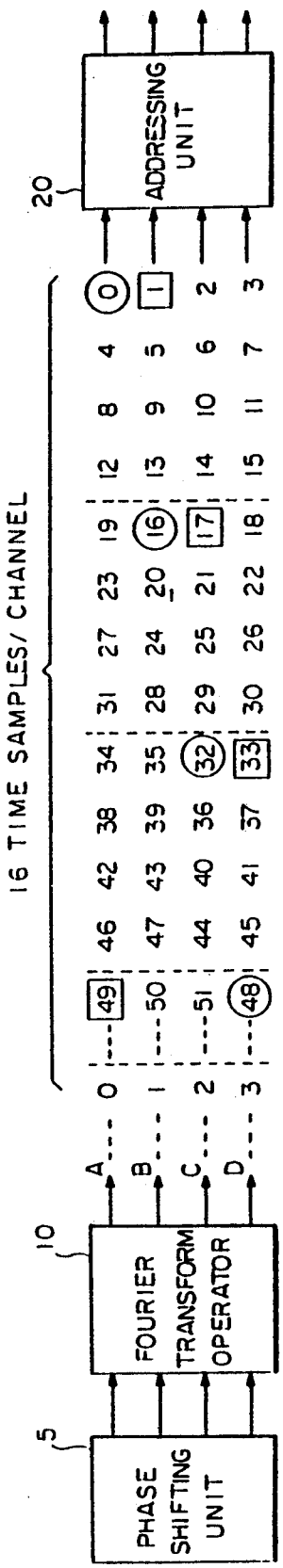
FIG. 2 is a depiction of the phase shifted order of the data words exiting an FFT processor of the present invention.

With reference to FIG. 2, in the present invention data entering the Fourier transform operator 10 is phase shifted as discussed above in a phase shifting unit 5. Data words exiting FFT 10 are output in four channels A-D in the order indicated by the numbers shown. In contrast to the order of data words shown in FIG. 1, the pre-FFT shift causes the data words required for input to the next stage (indicated by the circles) to now appear in separate channels. The next set of inputs to the next stage (shown in the squares) are similarly arranged. The selection of these and succeeding sets of four inputs from their respective channels is accomplished through a random access memory (RAM) addressing unit 20.

Another phase shift process is performed after data exit each stage's FFT for the following reason: With further reference to FIG. 2, observe that the second set of data points (#1, 17, 33, and 49) are in parallel, but are shifted by one from their proper destination RAM. Again, rather than switching data paths we utilize the shift property, this time in reverse, and post multiply (term by term) the $F_4$ computational unit output of the following stage by appropriate multipliers ($1, j, -1, -j$ for $R=4$) to achieve this same effect. These are simple phase shifts that can be absorbed into the ROM held coefficients $D_{16'}$ and $D_{64'}$ which are normally implemented in a radix 4 transform after each $F_4$.

This simplification to the systolic geometry method may be made by merging the phase shift operators with the twiddle factors. This reduces computational loading by creating a single complex multiplication of the data in each channel, replacing the two complex multiplications required for the twiddle factors and the phase shift operators. Operation of the merged operator is handled in a read-only-memory (ROM) unit.

The merge is accomplished by direct merge or by passing the phase shift operation $D_{PH}$ through the RAM shuffle operator $S_R$.

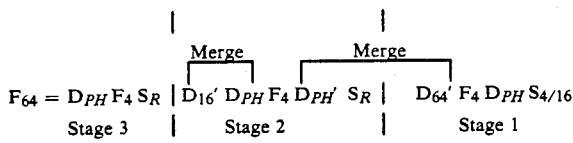

The final result is a reduced systolic geometry method.

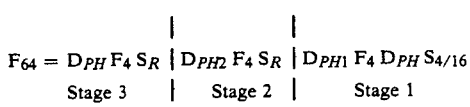

where, $D_{PH2} = D_{16'} D_{PH}$ and, $D_{PH1} = D_{PH'} D_{64'}$ (where $D_{PH'}$ is a reordered $D_{PH}$)

Figure 3:
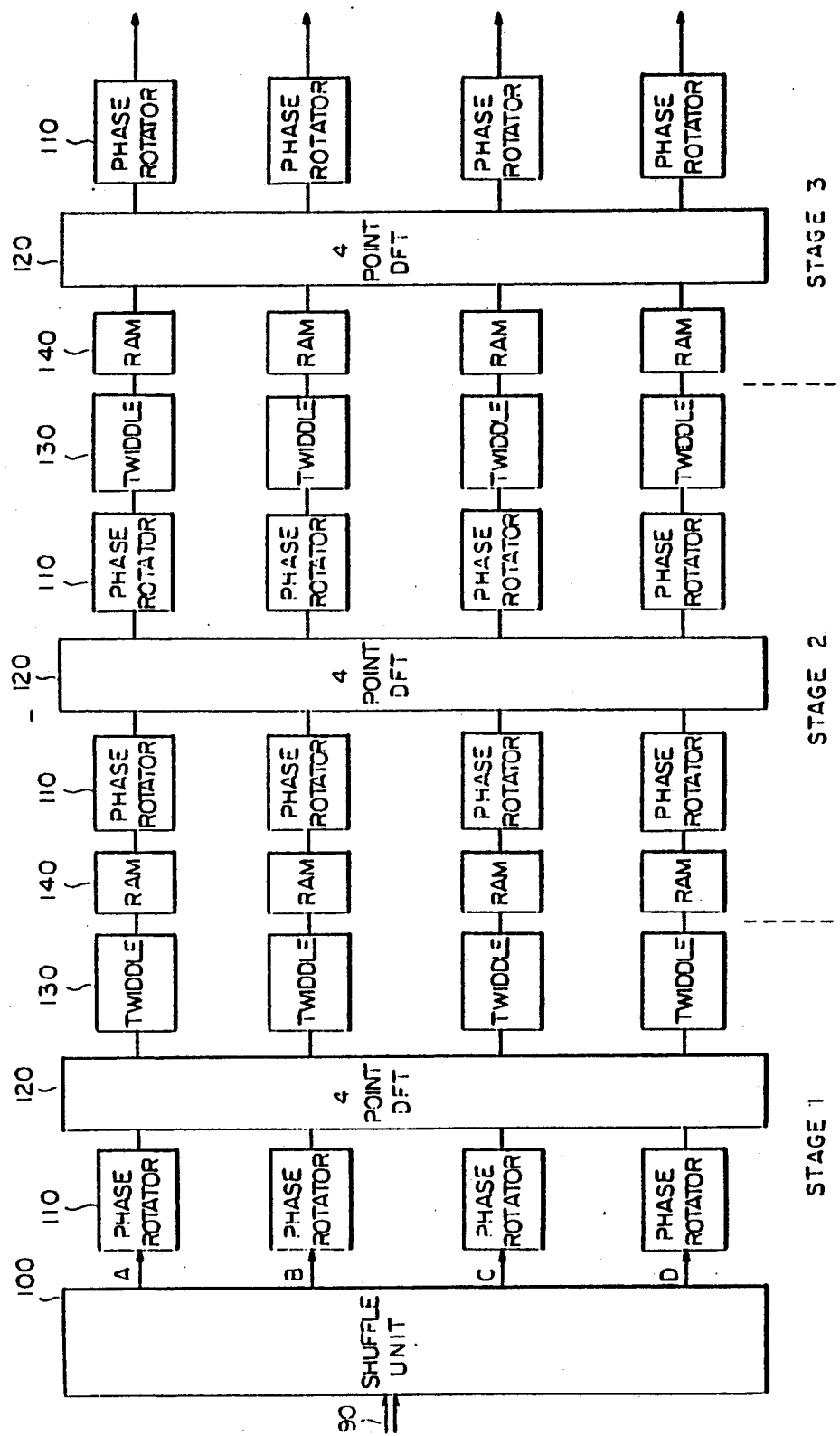
FIG. 3 is a schematic diagram of a 3 stage FFT processor incorporating the phase shifting scheme of FIG. 2.

With reference now to FIG. 3, a schematic is shown of the elements of an $N=64$, $R=4$, 3 stage FFT apparatus embodying the systolic method of the present invention. Data flow is from left to right.

Shuffle unit 100 receives data words 90 and arranges them into four channels A-D. While it is envisioned that shuffle unit 100 would perform the $S_{4/16}$ shuffle previously described, this unit could be removed where data is already available in the order provided by the $S_{4/16}$ shuffle. Phase rotator 110 is a multiplier unit that shifts the phase of the data words so that the order shown in FIG. 2 is available after the subsequent Fourier transform operation. For radix 4, the phase rotator 110 simply multiplies each channel by powers of j: for example channel A by 1 ($j^0$), B by j ($j^1$), C by $-1$ ($j^2$), and D by $-j$ ($j^3$). At higher radix operations, the multiplier is more complex (e.g., for radix 8 the phase in each of 8 channels must be shifted by multiples of 45°). Fourier transform operator 120 performs the DFT operations, calculating the Fourier transform of sets of 4 data words, one from each channel. Twiddle elements 130 include a memory for storing predetermined coefficients and a multiplier to multiply the data words by the coefficients. RAM units 140 perform the RAM shuffle ($S_R$) and are the data interfaces between stages.

For N greater than 64, stage 2 is repeated except that the second and subsequent stages include a post-FFT phase rotator before each pre-FFT phase rotator 110. As discussed above, the post-FFT phase rotator allows the second set of data to be accepted properly from the RAMs. For $N=64$, this function was absorbed in the reordered twiddles $D_{16'}$ and $D_{64'}$.

Figure 4:
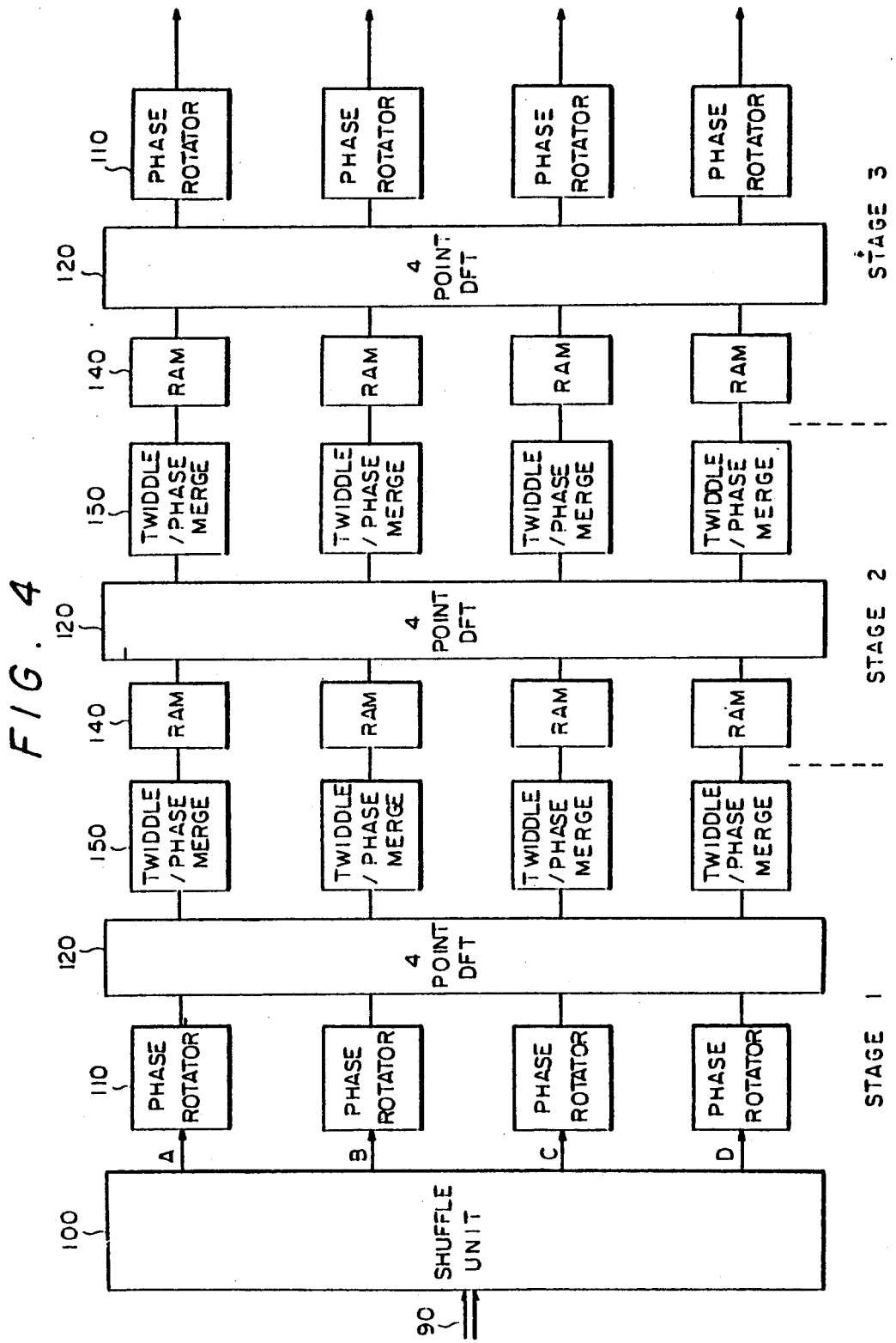
FIG. 4 is a schematic diagram of reduced systolic geometry version of the device in FIG. 3.

The reduced systolic geometry method is embodied in FIG. 4 wherein the identification numbers correspond to those in FIG. 3. Phase rotators 150 are the merged operators containing the twiddle coefficients merged with the phase shift multipliers.

The stage-to-stage symmetry of the device in FIG. 4 may be further enhanced by merging the phase rotators 110 in Stage 3 with a unity twiddle operator and by addressing the operators in phase rotator 110 in Stage 1 with a RAM element. These changes create a device wherein each stage has a RAM element, a Fourier transform operator and adjusted twiddle coefficients in programmable ROM (PROM).

Figure 5:
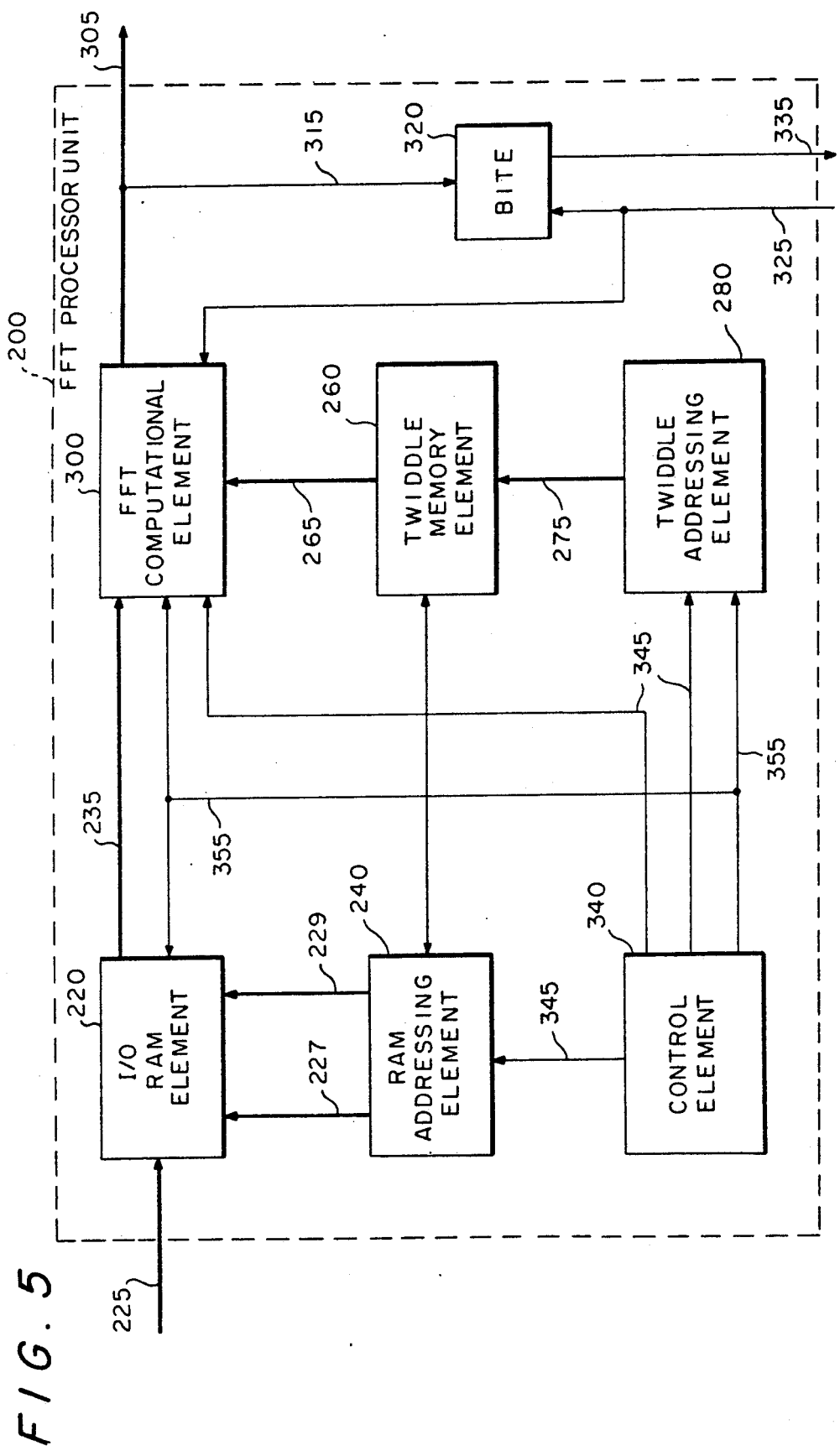
FIG. 5 is a schematic of a single stage of the processor of FIG. 4.

An FFT processor unit used as a stage in a multistage FFT apparatus and including these three pieces is shown in FIG. 5. For $N=64$ and $R=4$, three FFT processor units would be required.

The FFT processor unit 200 in FIG. 5 may be comprised of seven elements: an I/O RAM element 220, RAM addressing element 240, twiddle memory element 260, twiddle addressing element 280, FFT computational element 300, built-in test (BITE) element 320, and control element 340.

The I/O RAM element 220 is the data interface between successive stages. It receives input data 225 from the previous stage (or, for stage 1, from system inputs through an element such as a shuffle operator, not shown). The data may have two 16-bit components, forming a complex data word having a phase. The I/O RAM element 220 may be separated into four identical ports which interface directly with the four ports of the computational element 300. Each port may consist of recursive data buffers, and a double buffer RAM module. Each of the four RAM modules may consist of multiple RAMs (e.g., for $N=4096$, two $2K \times 16$ RAMs) with multiplexed inputs and outputs so that new input data can be written into RAM at the same time as data is being read from RAM. In this manner the FFT processor unit can be 100% utilized. RAM element 220 receives write address commands in bus 227 and read address commands in bus 229 from the RAM addressing element 240. Output data in bus 235 is provided to the FFT computational element 300.

The RAM addressing element 240 may consist of multiple PROMs (e.g., for N=4096, four 2K×8 PROMs). RAM addressing is divided into read and write addressing and into complex and real addressing.

The complex addressing portion uses the respective read or write addresses to store a complex data value. Real addressing adds an LSB to the complex address which controls access to the in-phase and quadrature components of each complex data value. For example, an LSB value of 0 may correspond to the in-phase or real component and a value of 1 to the quadrature or imaginary component. The FFT data can thereby be referenced as complex data using the complex address, with the inherent knowledge that the value of the LSB determines the real or imaginary component.

All RAM write addressing is sequential, driven by a count corresponding to a particular complex Fourier transform computation per FFT stage. Each successive complex point is written sequentially, with the real component first and imaginary component second. Thus a real counter can address the I/O RAM element 220. This sequential count is performed simultaneously for each of the four ports, and therefore resides on a single bus 227.

The read addressing is considerably more involved than the write addressing due to the RAM shuffle ($S_R$) of the input data to the FFT computation element 300. Since the data was written to RAM in sequential order in its proper channel, the read addressing must provide the selection of the required data words for each Fourier transform operation. The read addressing is accomplished through instructions in PROM memory addressed by a sequential counter tracking the current complex Fourier transform computation number. Each of the 4 RAMs in I/O RAM element 220 requires independent addressing in parallel in bus 229.

The twiddle memory element 260 may consist of multiple PROMs (e.g., for N=4096, eight 2K×8 PROMs) which contain the twiddle factor coefficients that are supplied to the FFT computational element 300. The data are supplied via four, parallel 16-bit ports in bus 265. As will be discussed later, the actual twiddles stored are those required for stage one of a transform for a predetermined N and R. From this stored data, the twiddle addressing scheme in twiddle addressing element 280 selects the correct coefficient for any Fourier transform operation per particular stage and transform size.

The twiddle addressing element 280 may consist of multiple PROMs (e.g., for N=4096, three 2K×8 PROMs) controlled by counters tracking the complex Fourier transform operation number as in the RAM addressing element 240. The element uses a masking scheme in which the addressing is incremented by an appropriate amount to compensate for different passes or transform sizes. Instructions are fed to the twiddle memory element 260 via line 275.

The control element 340 generates on-board control signals 345 for other elements and provides a clock-in signal 355 to synchronize all I/O data words and coefficients.

The BITE element 320 may draw on output data 305 as a source for test data using line 315. For example, by drawing on one port of output data 305, the BITE element 320 may use a 16-to-1 data multiplexer and an external control 325 to select one of 16 bits for external monitoring via line 335.

The FFT computational element (FFTCE) 300 is discussed with reference to FIG. 6, wherein the identification numbers are the same as in FIG. 5. While the FFTCE may be a single chip of unique design, its functions may also be performed by a cascade of existing chips such as the IBM SPE chip. The function of the FFTCE is to calculate the FFT matrix operations and to provide array scaling and rounding. It receives input data via bus 235, twiddle coefficients from bus 265, control functions via line 345, and the clock-in signal in line 355. Output data is supplied via bus 305. (The number adjacent each port or bus in FIG. 5 indicates the number of lines per port or bus.)

The FFTCE 300 calculates the radix 4 four point DFT by solving the following:

$$T(k)=[D(k)+D(k+1)+D(k+2)+D(k+3)]\times C(k)$$

$$T(k+1)=[D(k)-jD(k+1)-D(k+2)+jD(k+3)]\times C(k+1)$$

$$T(k+2)=[D(k)-D(k+1)+D(k+2)-D(k+3)]\times C(k+2)$$

$$T(k+3)=[D(k)+jD(k+1)-D(k+2)-jD(k+3)]\times C(k+3)$$

For k=0, 4, 8, ..., N−4
where T(i)=output vector
D(i)=data input vector
C(i)=twiddle coefficient or phase rotation vector
j=square root of −1

Note, because this is a radix 4, the phase rotator operation has been included in the equations by adding the C(i) vector. At higher radix operations, the phase rotation operation will require a separate complex multiplication operation (not shown). Alternatively, the phase rotators may be merged with the twiddle memory element coefficients to save a complex multiplication step.

Data may be received via bus 235 as data words. The data words may be complex, consisting of an in-phase component and a quadrative component. Each component is a 16-bit, fixed point, signed fractional, two's complement number. Four data words are received simultaneously, forming the vector D(i) in the equations shown above. Similarly, four twiddle coefficients are received from bus 265 in sync with the four data words, forming the vector C(i). With N=64 in this example, the FFTCE receives 16 vectors D(i) and C(i) for each pass through a stage, and outputs 16 vectors T(i), each comprised of four data words. The output is sent to the next stage via bus 305.

Figure 6:
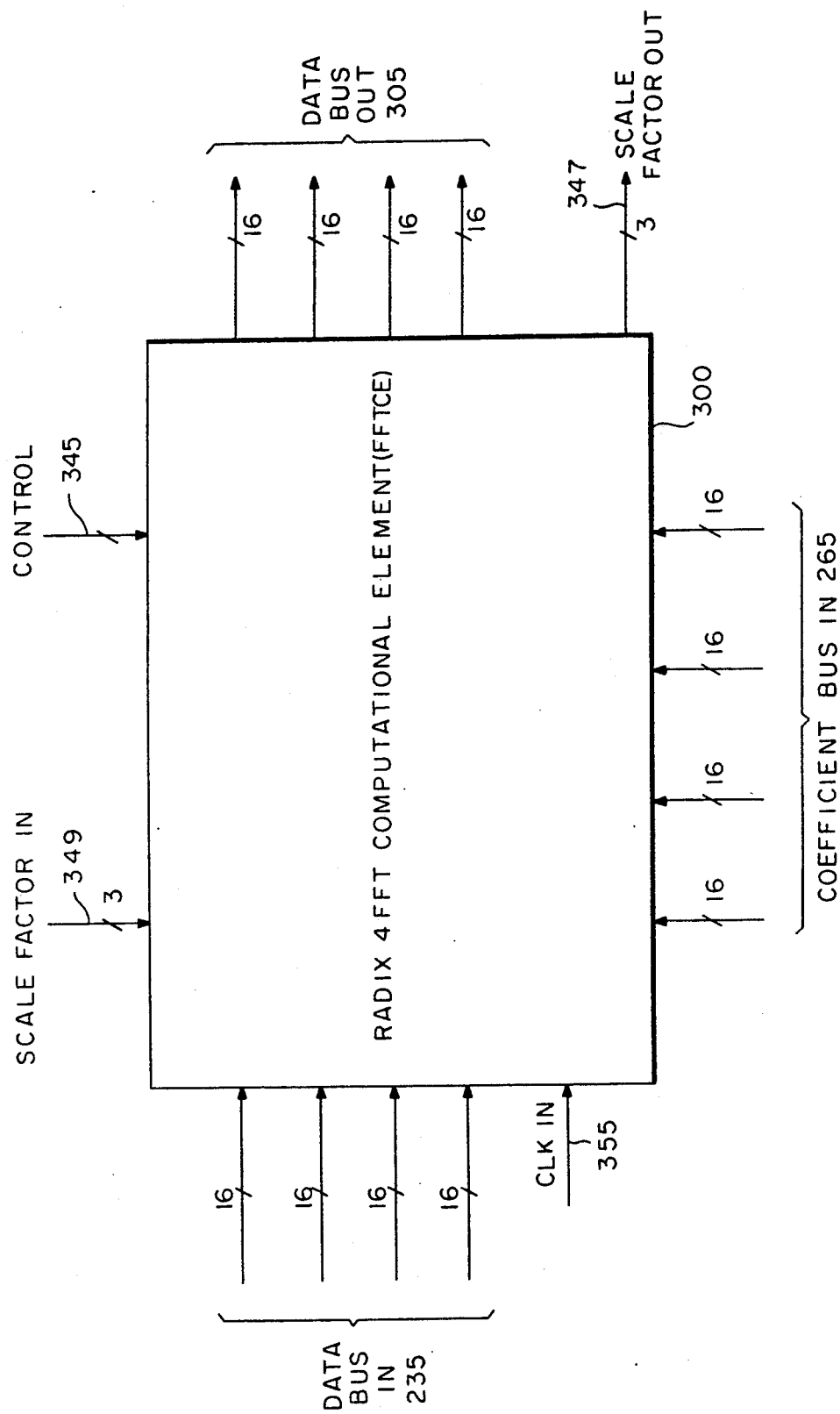
FIG. 6 is a depiction of the input and output of the FFT computational element in the stage of FIG. 5.

With further reference to FIG. 6, the FFTCE 300 may output a control word "scale factor out" 347 which equals the number of right shifts required to prevent overflow during subsequent processing. The output is received in the next stage as a "scale factor in" 349.

An embodiment of the architecture for the FFTCE is shown in FIG. 7 wherein the identification numbers correspond to those in FIG. 5. The data words in a vector D(i) enter in bus 235 and are appropriately scaled. Arithmetic logic units (ALU) 312, delays 314, "j" multiplier 316, and complex multipliers 318 using the C(i) vector from bus 265 provide the vector T(i) which is output in bus 305.

The values for vector C(i) stored in a twiddle memory element (260 in FIG. 4) of an N=64, R=4 systolic geometry FFT processor unit are shown in FIG. 8. The count of the Fourier transform calculations are shown in column A. The four values of C(i) for each stage are shown in columns B-D Each value represents "m" in the term exp $(-j2\pi m/N)$, where N=64.

The stage 2 twiddle coefficient values are seen to be a subset of those in stage 1. For larger N, this relation extends to later stages. When the power of j phase rotator is merged with the twiddles, however, the repetitiveness is destroyed. The stage 3 values shown are the result of merging the power of j multiplier with the units twiddle in stage 3. For the case where the power of j multiplier is not merged with the twiddle in stage 3, all twiddle values in stage 3 are zero.

ROM requirements may be further reduced by combining twiddle coefficients as shown in FIG. 8. A hardwired addressing scheme in the twiddle addressing element (280 in FIG. 4) selects the appropriate C(i) value, using the Fourier transform calculation number and the stage numbers. In the last stage only the circled values are accessed. For higher N, the patterns are similar, except that a variation of the circled group is repeated. For example, with N=256, each column would contain four consecutively repetitions of [0, 64, 128, 192].

Software simulation of the method just described shows that it could be used in a radix 2, 4, 8, or higher radix pipeline FFT. As the radix increases, the throughput rate goes up due to a greater degree of parallelism, provided the FFT computational processors at each stage can be structured with sufficient amount of parallelism in its internal architecture to keep up with the higher throughput rates. Depending on the processing speed required, high radix architecture may call for a pipeline processor within the FFT computational element (e.g, 8 point FFT, etc.)

While the method just described is a decimation-in-frequency (DIF) type, it should be understood that a decimation-in-time (DIT) version can be generated from the DIF method by performing a matrix transpose of the DFT matrix, $F_{64}$, when it is symmetric. $F_{64}$ is made symmetric by post multiplying with the shuffle matrix $S_{4/16}$ which reverts the rows of $F_{64}$ to natural (increasing frequency) order. The DIT version (after post-multiplying the DIF version by $S_{4/16}$ and transposing the result) is:

$$F_{64}^T = S_{16/4} D_{PH} F_4 D_{PH1} S_R^T F_4 D_{PH2} S_R^T F_4 D_{PH} S_{16/4}$$

where,
$S_{16/4} = S_{4/16}^T$,
$S_R^T$ is the transpose of $S_R$, and
$F_{64}^T$ is the DIT DFT matrix.

Since $F_4$ is a block diagonal matrix containing 4-point kernel DFTs along the diagonal and each DFT is assummed in natural order and therefore a symmetric 4-by-4 matrix, the matrix $F_4$ is therefore symmetric and unchanged by transpositions. All of the "D" matrices containing phase rotation and twiddle factors are already diagonal and therefore symmetric. Only the shuffle matrices $S_{4/16}$ and $S_R$ are changed by the transpose operation. Note, the twiddle factor matrices now precede the $F_4$ matrices which is characteristic of decimation-in-time processors and methods.

In an alternative embodiment, the functions of the phase shift operators could be performed with cyclic commutator switches. While this does introduce cross channel communication, it does so outside of the FFT computational element. Such an embodiment may be attractive at low speed, low radix operations.

The techniques described above could also be applied in a recursive FFT processor. Recursive processor applications, wherein the same hardware is used repetitively, may be appropriate when low processing speed is acceptable.

While the preferred embodiments of the present invention have been described, variations and modifications will naturally occur to those skilled in the art from a perusal hereof. It is therefore, to be understood that the embodiments described are illustrative only and that the scope of the invention is to be defined solely by the appended claims when accorded a full range of equivalence.

What is claimed is:

1. An apparatus for calculating the Fast Fourier Transform of N complex data words, comprising:
input memory means for receiving said data words and arranging them in R channels, having R outputs corresponding to said R channels; and
plural serially connected stages for transforming said data words, the first of said stages receiving said data words in R channels from said input memory means outputs;
each of said stages except the first and the last comprising:
R input means and R output means corresponding to said R channels for connecting said stages,
R shuffle means for aligning in time R inputs from said input means, one of said R inputs from each of said R channels, in a vector,
R first multiplier means connected to said R shuffle means for shifting the phase of said vector,
a Fourier transform operator connected to said R first multiplier means for performing a Fourier transform on each said phase-shifted vector,
R second multiplier means connected to said Fourier transform operator for shifting the phase of the transformed data words after said transformed data words are output from said Fourier transform operator, and
R third multiplier means connected to said R second multiplier means for providing predetermined twiddle coefficients to each of said phase-shifted transformed data words,
each of said R channels extending from said input means to said output means and not communicating with another of said R channels, except within said Fourier transform operator.

2. The apparatus as defined in claim 1 wherein each said Fourier transform operator comprises means for providing a block diagonal matrix having R-point Fourier transforms along the block diagonal.

3. The apparatus as defined in claim 1, wherein each of said first R multiplier means comprises multiplier means for shifting the phase of said vector by integer multiples of 360/R degrees.

4. The apparatus as defined in claim 1, wherein each of said R third multiplier means comprises:
one or more programmable read-only memory means containing said predetermined twiddle coefficients;
tracking means for counting the number of operations performed by said Fourier transform operator; and an addressing element for selecting said predetermined twiddle coefficients from said programmable read-only memory means using said tracking means.

5. The apparatus as defined in claim 1 wherein the number of said stages is $Log_R N$.

6. The apparatus as defined in claim 1 wherein said shuffle means from the second and succeeding of said stages are located between said R third multiplier means and said output means in the preceding one of said stages.

7. The apparatus as defined in claim 1 wherein R=4 and wherein said R first multiplier means rotate the phase of said vector 90 degrees by multiplying said vector by a power of j, wherein the power of j multipliers for each of said channels are consecutive, integer powers of j starting at zero.

8. Apparatus for performing Fourier transformations on an input stream of N complex digital data words, comprising:
receiving means to receive said data words in R channels;
processing means for processing input data words in $Log_R N$ serially arranged stages, said input data words being input from said receiving means in the first of said stages and thereafter from the preceding of said stages, wherein each of said stages comprises:
a shuffle operator for aligning in time R of said input data words in a vector, each said vector comprising one of said data words from each of said R channels drawn at intervals of N/R,
phase shifting means for modifying said vector received from said shuffle operator without transferring said input data words among said channels, the phase of said input data words in each of said channels being shifted by an integer multiple of 360/R degrees; and
a Fourier transform operator for performing Fourier transforms on each said phase-shifted vector received from said phase shifting means, comprising plural matrix operators of radix R.

9. An apparatus for performing the Fast Fourier Transform of complex digital data words, comprising:
plural data channels;
plural serially arranged Fourier transform means each connected to all said channels for computing the Fourier transform of groups of said digital data words, said groups being derived from one said data word from each of said channels;
plural phase shifting means, one operating in each said channel in conjunction with one of said plural Fourier transform means, each said shifting means modifying the phase of said data words in one said channel antecedent to said one Fourier transform means; and
plural shuffle means, one operating in each said channel in conjunction with one of said plural Fourier transform means, each shuffle means arranging said data words in one of said channels antecedent to said one Fourier transform means,
whereby said data words in one said channel are not transferred to another said channel, except within each of said plural Fourier transform means.

10. The apparatus as defined in claim 9, wherein each of said plural Fourier transform means comprises means for providing a block diagonal matrix having Fourier transforms along the block diagonal.

11. The apparatus as defined in claim 9, wherein there are R said data channels and wherein each of said phase shifting means comprises multiplier means for shifting the phase of said data words by an integer multiple of 360/R degrees.

12. An apparatus for calculating the Fast Fourier Transform of complex data words, having plural serially connected stages for transforming said data words, each of said stages between the first and last of said stages comprising:
R input means and R output means corresponding to R channels for respectively receiving and providing input data to the next of said stages;
R shuffle means connected to said input means for aligning in time R of said input data in a vector, wherein each said vector comprises one of said input data from each of said channels;
a Fourier transform operator connected to said R shuffle means for performing a Fourier transform on each said vector; and
R multiplier means for shifting the phase of said transformed vector and for providing predetermined twiddle coefficients to said transformed vector before said transformed vector is input to said Fourier transform operator in the next of said serially connected stages,
each of said R channels not communicating with another of said R channels between said input means and said output means except in said Fourier transform operator.

13. The apparatus as defined in claim 12 wherein said Fourier transform operator comprises means for providing a block diagonal matrix having R-point Fourier transforms along the block diagonal.

14. The apparatus as defined in claim 12, wherein each of said R multiplier means comprises:
one or more programmable read-only memory means containing said predetermined twiddle coefficients;
tracking means for counting the number of operations performed by said Fourier transform operator; and
an addressing element for selecting said predetermined twiddle coefficient from said programmable read-only memory means using said tracking means.

15. Apparatus having R channels for performing Fourier transformations on an input stream of N digital data words, comprising:
an N by N matrix operator connected to said R channels for aligning in time R of said data words in a vector, each said vector comprising one of said data words from each of said R channels drawn at intervals of N/R from said stream of N digital data words;
phase shifting means connected to said R channels for modifying said data words in said vector without transferring said data words among said channels; and
a Fourier transform operator connected to said phase shifting means for performing Fourier transforms on said vector.

16. The apparatus as defined in claim 15 wherein said Fourier transform operator comprises means for providing a block diagonal matrix having R-point Fourier transforms along the block diagonal.

17. An apparatus for calculating the Fast Fourier Transform of N complex data words comprising:

input memory means for receiving said data words and arranging them in R channels, having R outputs corresponding to said R channels; and plural serially connected stages for transforming said data words, the first of said stages comprising,
R input means for receiving said data words in R channels from said input memory means,
R output means corresponding to said R channels for connecting said first stage to the succeeding one of said serially connected stages,
R shuffle means for aligning in time R of said data words in a vector, each said vector comprising one of said data words from each of said channels,
a Fourier transform operator for performing a Fourier transform on each of said vector, and
output memory means for outputting the Fourier transform of said N complex data words, and for inputting said Fourier transform of said N complex data words to said succeeding stage,
said Fourier transform operator being preceded by R first multiplier means for shifting the phase of said data words, and
said Fourier transform operator being succeeded by R second multiplier means for shifting the phase of said transformed data words, and
wherein between said input memory means and said output memory means, data words in one of said channels are not transferred to another of said channels, except within said Fourier transform operator.

18. The apparatus as defined in claim 17 wherein said second multiplier means comprises a third multiplier means for providing predetermined twiddle coefficients to each of said transformed data words.

19. The apparatus as defined in claim 18, wherein each of said third multiplier means comprises:
at least one programmable read-only memory means containing said predetermined twiddle coefficients;
tracking means for counting the number of operations performed by said Fourier transform operator; and
an addressing element for selecting said predetermined twiddle coefficient from said programmable read-only memory means using said tracking means.

20. The apparatus as defined in claim 17 wherein each said Fourier transform operator comprises means for providing a block diagonal matrix having R-point Fourier transforms along the block diagonal.

21. The apparatus as defined in claim 17, wherein each of said first R multiplier means comprises multiplier means for shifting the phase of said data words by integer multiples of 360/R degrees.

22. The apparatus as defined in claim 17 wherein said first multiplier means comprises a third multiplier means for providing predetermined twiddle coefficients to each of said data words.

* * * * *